United States Patent Office 2,769,819
Patented Nov. 6, 1956

1

2,769,819

ALKYLENE-DIAZIDES

Armiger H. Sommers and James D. Barnes, Waukegan, Ill., assignors to Abbott Laboratories, North Chicago, Ill., a corporation of Illinois No Drawing. Application February 9, 1955, Serial No. 487,220

8 Claims. (Cl. 260—349)

This invention relates to a new class of diazides and more particularly polymethylene diazides. The invention also relates to a novel method for making said compounds.

The compounds to which this invention pertains are those having the chemical formula $$N_3-(CH_2)_n-N_3$$

wherein $n$ is 5–10 inclusive. These compounds are oily liquids at ordinary temperatures and they may be handled without danger, employing only the ordinary precautions with compounds of this type.

The compounds are useful for lowering the blood pressure and for the relief of hypertension.

The compounds are prepared by heating together one mol of a polymethylene dihalide having between 5 to 10 carbon atoms inclusive with about two mols of an alkali metal azide, and recovering the resulting polymethylene diazide from the reaction mixture. Beyond the limits of 5–10 carbons the activity of the compounds diminishes considerably. The details of the method will be more clearly evident upon examination of the accompanying example.

As suitable alkali metal azides sodium azide is most readily available but potassium and other alkali metal azides may also be used. The polymethylene dibromides are especially suitable for use in this reaction but the polymethylene diiodides and the polymethylene dichlorides may also be used if desired. In the reaction it is desirable to employ solutions of the two reactants and they may be dissolved in a mutual solvent if desired, or each may be dissolved in a selective solvent for it and the two solutions mixed together with heating. The reactants need not be completely soluble in the solvent because the reaction will proceed when only a small amount of each reactant is in solution, according to well-known principles of chemical reactions.

The following example is presented in order to disclose the invention in full detail but it should be understood that the invention is not intended to be limited in any way by this example.

EXAMPLE I 1,7-diazidoheptane

To a solution of 25.8 g. of 1,7-dibromoheptane in 225 ml. of methanol is added a mixture of 16.3 g. of sodium azide and 15 ml. of water. The mixture is heated and refluxed for 24 hours, and the methanol is then removed by distillation. The residue is diluted with 50 ml. of water and shaken with 100 cc. of ether. The ether layer is separated, dried, and distilled. There is obtained 16.3 g. of 1,7-diazidoheptane, a colorless oil boiling at 117° C. at 5 mm. $n_D^{25}$ 1.4700. Calculated N, 46.12%: Found N, 45.77%.

Other diazidoalkanes falling within the scope of the invention may be prepared in a manner similar to that described in Example I merely by substituting the appropriate polymethylene dihalide in place of the 1,7-dibromoheptane. In some instances, refluxing for as little as 12 hours has been found to provide a good yield of product.

The following compounds were prepared by the method described in Example I:

1,5-diazidopentane; B. P. 100° C./9 mm.; $n_D^{25}$ 1.4729.
 Nitrogen analysis, calculated 54.52%; found 54.80%.
1,6-diazidohexane; B. P. 119° C./12 mm.; $n_D^{25}$ 1.4707.
 Nitrogen analysis, calculated 49.97%; found 49.42%.
1,8-diazidooctane; B. P. 129° C./5 mm.; $n_D^{25}$ 1.4698.
 Nitrogen analysis, calculated 42.82%; found 43.46%.
1,9-diazidononane; B. P. 142° C./6 mm.; $n_D^{25}$ 1.4686.
 Nitrogen analysis, calculated 39.97%; found 39.93%.
1,10-diazidodecane; B. P. 104° C./0.2 mm.; $n_D^{25}$ 1.4693.
 Nitrogen analysis, calculated 37.47%; found 37.41%.

Others may practice this invention in any of the other numerous ways which will be suggested to one skilled in the art by a reading of this disclosure. All such practice of this invention is intended to be covered hereby provided it falls within the scope of the appended claims.

We claim:

1. An azide having the formula $$N_3-(CH_2)_n-N_3$$

where $n$ is 5–10 inclusive.
2. 1,6-diazidohexane.
3. 1,7-diazidoheptane.
4. 1,8-diazidooctane.
5. 1,9-diazidononane.
6. 1,10-diazidodecane.
7. The method of making a diazido compound which comprises heating one mol of a polymethylene dihalide having between 5 and 10 carbon atoms inclusive with about two mols of an alkali metal azide, and recovering the resulting polymethylene diazide from the reaction mixture.
8. The method of making a diazido compound which comprises heating one mol of a polymethylene dihalide having between 5 and 10 carbon atoms inclusive with about two mols of sodium azide, extracting the residue with a solvent for the resulting polymethylene diazide, and recovering the polymethylene diazide from said solvent.

References Cited in the file of this patent

UNITED STATES PATENTS 2,115,275   Moran _____ Apr. 26, 1938

OTHER REFERENCES

Forster et al.: Jour. Chem. Soc. (London), vol. 93, pp. 1070–71.